(12) United States Patent
Wang et al.

(10) Patent No.: US 7,944,623 B2
(45) Date of Patent: May 17, 2011

(54) FIXED-FOCUS LENS

(75) Inventors: Kuo-Chuan Wang, Hsinchu (TW);
Yu-Hung Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/636,030

(22) Filed: Dec. 11, 2009

(65) Prior Publication Data

US 2010/0157444 A1    Jun. 24, 2010

Related U.S. Application Data

(60) Provisional application No. 61/193,808, filed on Dec. 24, 2008.

(30) Foreign Application Priority Data

May 21, 2009   (TW) ................................ 98116861 A

(51) Int. Cl.
*G02B 13/18* (2006.01)
(52) U.S. Cl. ....................................... 359/716; 359/749
(58) Field of Classification Search .................. 359/716, 359/749, 781, 784, 769, 760, 774, 680, 689, 359/686
See application file for complete search history.

(56) References Cited

U.S. PATENT DOCUMENTS

| | | | |
|---|---|---|---|
| 6,188,523 B1 * | 2/2001 | Choi .............................. | 359/649 |
| 6,542,316 B2 | 4/2003 | Yoneyama | |
| 6,560,041 B2 | 5/2003 | Ikeda et al. | |
| 6,621,645 B2 | 9/2003 | Sato | |
| 6,885,506 B2 | 4/2005 | Yoneyama | |
| 6,999,247 B2 | 2/2006 | Kim | |
| 7,123,426 B2 | 10/2006 | Lu et al. | |
| 7,126,767 B2 | 10/2006 | Lu | |
| 7,173,777 B1 | 2/2007 | Lu et al. | |
| 7,184,219 B2 | 2/2007 | Kobayashi | |

* cited by examiner

*Primary Examiner* — Timothy J Thompson
(74) *Attorney, Agent, or Firm* — J.C. Patents

(57) ABSTRACT

A fixed-focus lens adapted to be disposed between a magnified side and a reduced side is provided. The fixed-focus lens includes a first lens group, a second lens group, and a third lens group. The first lens group disposed between the magnified side and the reduced side includes three lenses and has a negative refractive power. The second lens group disposed between the first lens group and the reduced side includes five lenses and has a positive refractive power. The third lens group disposed between the second lens group and the reduced side includes five lenses and has a positive refractive power. The fixed-focus lens satisfies $|F_1/F|<1.35$, $3.5<|F_2/F|<4.5$, and $4<|F_3/F|<5$, wherein $F_1$ is the effective focal length (EFL) of the first lens group, $F_2$ is the EFL of the second lens group, $F_3$ is the EFL of the third lens group, and F is the EFL of the fixed-focus lens.

20 Claims, 8 Drawing Sheets

US 7,944,623 B2

FIXED-FOCUS LENS

CROSS-REFERENCE TO RELATED APPLICATION

This application claims the priority benefit of U.S.A. provisional application Ser. No. 61/193,808, filed on Dec. 24, 2008, and claims the priority of Taiwan application serial no. 98116861, filed on May 21, 2009. The entirety of each of the above-mentioned applications is incorporated herein by reference.

BACKGROUND OF THE INVENTION

1. Field of the Invention

The invention generally relates to a lens, and more particularly, to a fixed-focus lens.

2. Description of Related Art

Generally, a longer projection distance is required if a projector needs to project an image onto a larger screen. Contrarily, a special wide-angle lens is usually required if the image needs to be projected onto the larger screen from a shorter projection distance.

How to reduce image aberration is one of the major subjects in the design of wide-angle lenses. Thus, various techniques (for example, the U.S. Pat. No. 6,621,645,U.S. Pat. No. 6,560,041,U.S. Pat. No. 6,999,247,U.S. Pat. No. 6,542,316,U.S. Pat. No. 6,885,506, U.S. Pat. No. 7,184,219, U.S. Pat. No. 7,126,767, U.S. Pat. No. 7,123,426, and U.S. Pat. No. 7,173,777) have been provided to reduce image aberration in a wide-angle lens.

In the U.S. Pat. No. 6,621,645 and U.S. Pat. No. 6,560,041, some lenses in a wide-angle lens are implemented with aspherical lenses. However, in the U.S. Pat. No. 6,621,645, at least one molding glass is adopted, and in the U.S. Pat. No. 6,560,041, at least three aspherical lenses are adopted. As a result, the production cost of the wide-angle lens is increased, and the assembly process thereof is made more complicated. Contrarily, if fewer aspherical lenses are adopted and at the same time, the image aberration is improved, both the total length of the wide-angle lens and the volume of the projection system are increased. For example, the total lengths of both lenses in the U.S. Pat. No. 6,999,247 and U.S. Pat. No. 6,542,316 are greater than 150 mm.

On the other hand, more lenses may also be disposed to reduce image aberration. For example, more than fourteen lenses are respectively adopted in the U.S. Pat. No. 6,885,506 and U.S. Pat. No. 7,184,219. However, this may complicate the assembly process and increase the production cost of the wide-angle lens. Thereby, a lens with both lower production cost and higher imaging quality is to be provided.

SUMMARY OF THE INVENTION

Accordingly, the invention is directed to a fixed-focus lens having lower cost and better optical features.

Additional aspects and advantages of the invention may be set forth in part in following descriptions.

According to an embodiment of the invention, a fixed-focus lens adapted to be disposed between a magnified side and a reduced side is provided. The fixed-focus lens includes a first lens group, a second lens group, and a third lens group. The first lens group is disposed between the magnified side and the reduced side and has a negative refractive power. The first lens group includes a first lens, a second lens, and a third lens arranged in sequence from the magnified side to the reduced side, wherein the first lens is an aspherical lens, and the refractive powers of the first lens, the second lens, and the third lens are all negative. The second lens group is disposed between the first lens group and the reduced side and has a positive refractive power. The second lens group includes a fourth lens, a fifth lens, a sixth lens, a seventh lens, and an eighth lens arranged in sequence from the magnified side to the reduced side, wherein the refractive powers of the fourth lens, the fifth lens, the sixth lens, the seventh lens, and the eighth lens are respectively negative, positive, positive, negative, and positive. The third lens group is disposed between the second lens group and the reduced side and has a positive refractive power. The third lens group includes a ninth lens, a tenth lens, an eleventh lens, a twelfth lens, and a thirteenth lens arranged in sequence from the magnified side to the reduced side, wherein the refractive powers of the ninth lens, the tenth lens, the eleventh lens, the twelfth lens, and the thirteenth lens are respectively positive, negative, positive, negative, and positive. The fixed-focus lens satisfies $|F_1/F|<1.35$, $3.5<|F_2/F|<4.5$, and $4<|F_3/F|<5$, wherein $F_1$ is the effective focal length (EFL) of the first lens group, $F_2$ is the EFL of the second lens group, $F_3$ is the EFL of the third lens group, and F is the EFL of the fixed-focus lens.

According to another embodiment of the invention, a fixed-focus lens adapted to be disposed between a magnified side and a reduced side is provided. The fixed-focus lens includes a first lens group and a second lens group. The first lens group is disposed between the magnified side and the reduced side and has a negative refractive power. The first lens group includes a first lens, a second lens, and a third lens arranged in sequence from the magnified side to the reduced side, wherein the first lens is an aspherical lens, and the refractive powers of the first lens, the second lens, and the third lens are all negative. The second lens group is disposed between the first lens group and the reduced side and has a positive refractive power. The second lens group includes a fourth lens, a fifth lens, a sixth lens, a seventh lens, an eighth lens, a ninth lens, a tenth lens, an eleventh lens, a twelfth lens, and a thirteenth lens arranged in sequence from the magnified side to the reduced side, wherein the refractive powers of the fourth lens, the fifth lens, the sixth lens, the seventh lens, the eighth lens, the ninth lens, the tenth lens, the eleventh lens, the twelfth lens, and the thirteenth lens are respectively negative, positive, positive, negative, positive, positive, negative, positive, negative, and positive. The fixed-focus lens satisfies $|F_1/F|<1.35$ and $4<F_2/F|<6.5$, wherein $F_1$ is the EFL of the first lens group, $F_2$ is the EFL of the second lens group, and F is the EFL of the fixed-focus lens.

The embodiment or the embodiments of the invention may have at least one of the following advantages. As described above, the embodiment of the invention provides a fixed-focus lens having thirteen lenses, wherein the lens closest to the magnified side is an aspherical lens, and the fixed-focus lens satisfies $|F_1/F|<1.35$. Thereby, the fixed-focus lens in the embodiment of the invention has wider field angle, better imaging quality, simpler assembly process, and lower cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
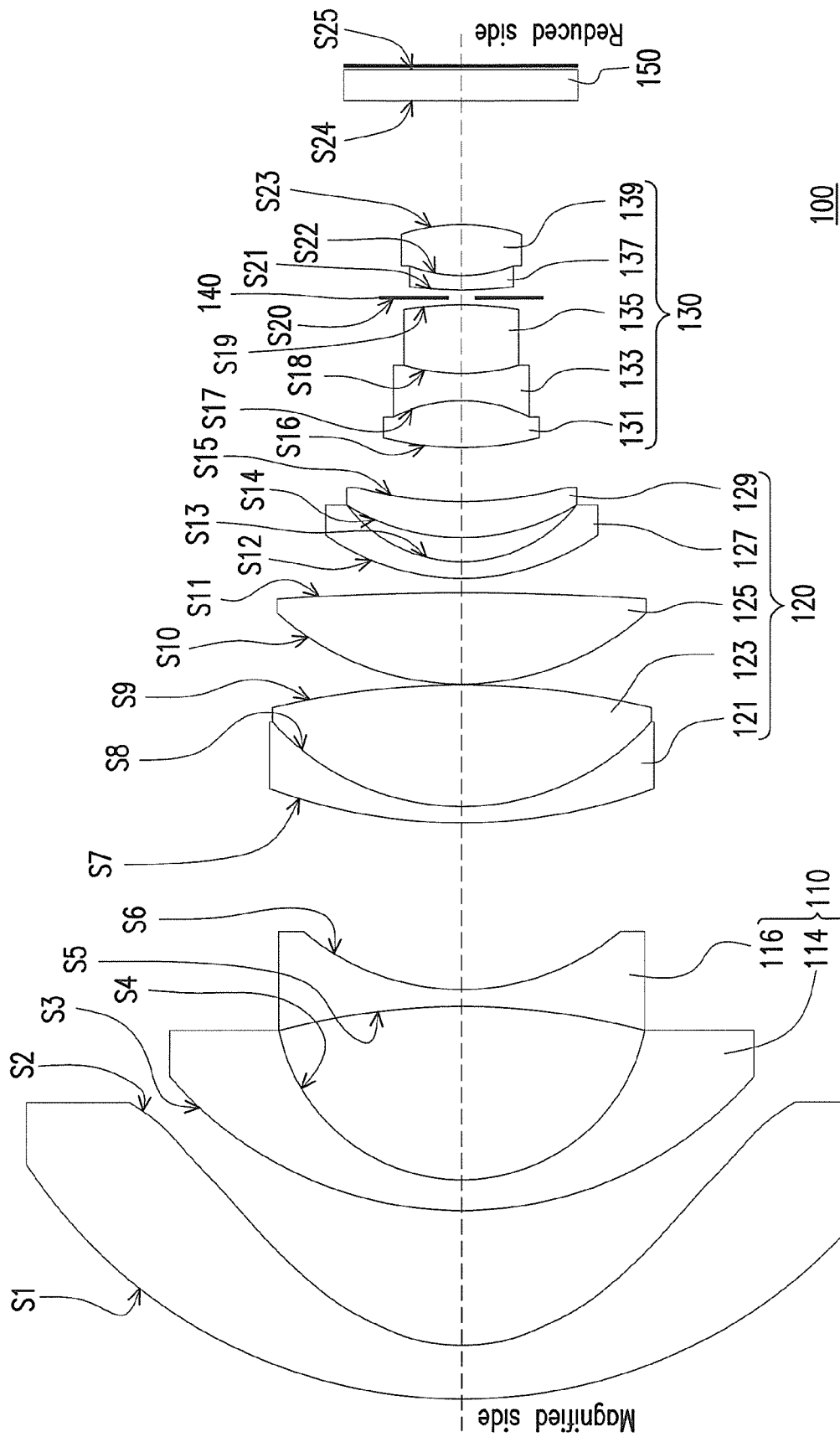
FIG. 1 is a diagram of a fixed-focus lens according to an embodiment of the invention.

Referring to FIG. 1, the fixed-focus lens 100 is adapted to be disposed between a magnified side and a reduced side. The fixed-focus lens 100 includes a first lens group 110, a second lens group 120, and a third lens group 130. The first lens group 110 is disposed between the magnified side and the reduced side and has a negative refractive power. The first lens group 110 includes a first lens 112, a second lens 114, and a third lens 116 arranged in sequence from the magnified side to the reduced side, wherein the first lens 112 is an aspherical lens, and the refractive powers of the first lens 112, the second lens 114, and the third lens 116 are all negative.

The second lens group 120 is disposed between the first lens group 110 and the reduced side and has a positive refractive power. The second lens group 120 includes a fourth lens 121, a fifth lens 123, a sixth lens 125, a seventh lens 127, and an eighth lens 129 arranged in sequence from the magnified side to the reduced side, wherein the refractive powers of the fourth lens 121, the fifth lens 123, the sixth lens 125, the seventh lens 127, and the eighth lens 129 are respectively negative, positive, positive, negative, and positive.

The third lens group 130 is disposed between the second lens group 120 and the reduced side and has a positive refractive power. The third lens group 130 includes a ninth lens 131, a tenth lens 133, an eleventh lens 135, a twelfth lens 137, and a thirteenth lens 139 arranged in sequence from the magnified side to the reduced side, wherein the refractive powers of the ninth lens 131, the tenth lens 133, the eleventh lens 135, the twelfth lens 137, and the thirteenth lens 139 are respectively positive, negative, positive, negative, and positive.

In the embodiment, the fixed-focus lens 100 satisfies $|F_1/F|<1.35$, $3.5<|F_2/F|<4.5$, and $4<|F_3/F|<5$, wherein $F_1$ is the effective focal length (EFL) of the first lens group 110, $F_2$ is the EFL of the second lens group 120, $F_3$ is the EFL of the third lens group 130, and F is the EFL of the fixed-focus lens 100. Thus, the fixed-focus lens 100 has a wider field angle. Additionally, in the embodiment, the fixed-focus lens 100 further includes an aperture stop 140 disposed between the eleventh lens 135 and the twelfth lens 137.

An embodiment of the fixed-focus lens 100 may be described below. The data listed in following table 1 is not intended to limiting the invention, and those having ordinary skill in the art should be able to alter the data appropriately according to the disclosure, which still belongs to the scope of the invention.

TABLE 1

| Surface | Curvature Radius (mm) | Space (mm) | Refractive Index | Abbe Number | Note |
|---|---|---|---|---|---|
| S1 | 57.1506 | 5.481546 | 1.491756 | 57.44 | First lens |
| S2 | 19.36111 | 13.63087 | | | |
| S3 | 38.78057 | 3.304252 | 1.693186 | 52.39 | Second lens |
| S4 | 18.77268 | 17.83565 | | | |
| S5 | −65.7136 | 1.601909 | 1.810747 | 40.21 | Third lens |
| S6 | 25.06597 | 17.24127 | | | |
| S7 | 56.48923 | 1.600779 | 1.846047 | 23.94 | Fourth lens |
| S8 | 25.50005 | 12.45584 | 1.687334 | 29.89 | Fifth lens |
| S9 | −84.9628 | 0.12708 | | | |
| S10 | 27.43156 | 9.539539 | 1.54573 | 46.66 | Sixth lens |
| S11 | −220.912 | 1.427697 | | | |
| S12 | 23.56202 | 1.6 | 1.804001 | 46.57 | Seventh lens |
| S13 | 14.47354 | 2.660639 | | | |
| S14 | 22.18387 | 3.708987 | 1.64826 | 32.58 | Eighth lens |
| S15 | 43.90591 | 5.571267 | | | |
| S16 | 34.04832 | 4.661462 | 1.512587 | 65 | Ninth lens |
| S17 | −15.7668 | 2.767975 | 1.804 | 46.57 | Tenth lens |
| S18 | 17.93661 | 7.2 | 1.497088 | 81.43 | Eleventh lens |
| S19 | −23.7872 | 0.1 | | | |
| S20 | Infinite | 0.281594 | | | Aperture stop |
| S21 | 37.69937 | 1.6 | 1.832924 | 27.95 | Twelfth lens |
| S22 | 16.28095 | 5.118393 | 1.497001 | 81.54 | Thirteenth |
| S23 | −19.2928 | 21.5 | | | |
| S24 | Infinite | 3 | 1.48749 | 70.24 | Glass cover |
| S25 | Infinite | 0.483 | | | |

In foregoing table 1, the space refers to the linear distance between two adjacent surfaces on the optical axis. For example, the space of the surface S1 refers to the linear distance between the surface S1 and the surface S2 on the optical axis. The thickness and Abbe number corresponding to each lens in the note field may be referred to the corresponding values of space, thickness, and Abbe number in the same row.

Besides, in foregoing table 1, the surfaces S1 and S2 are two surfaces of the first lens 112, the surfaces S3 and S4 are two surfaces of the second lens 114, the surfaces S5 and S6 are two surfaces of the third lens 116, the surface S7 is the surface of the fourth lens 121 facing the magnified side, the surface S8 is the surface connecting the fourth lens 121 and the fifth lens 123, the surface S9 is the surface of the fifth lens 123 facing the reduced side, the surfaces S10 and S11 are two surfaces of the sixth lens 125, the surfaces S12 and S13 are the two surfaces of the seventh lens 127, and the surfaces S14 and S15 are the two surfaces of the eighth lens 129.

The surface S16 is the surface of the ninth lens 131 facing the magnified side, the surface S17 is the surface connecting the ninth lens 131 and the tenth lens 133, the surface S18 is the surface connecting the tenth lens 133 and the eleventh lens 135, the surface S19 is the surface of the eleventh lens 135 facing the reduced side, the surface S20 is the surface of the aperture stop 140, the surface S21 is the surface of the twelfth lens 137 facing the magnified side, the surface S22 is the surface connecting the twelfth lens 137 and the thirteenth lens 139, and the surface S23 is the surface of the thirteenth lens 139 facing the reduced side. The parameters (for example, curvature radius and space, etc) of each surface may be referred to foregoing table 1 therefore may not be described herein.

Moreover, the surfaces S1 and S2 are aspherical surfaces, and the surfaces S1 and S2 may be expressed as:

$$Z = \frac{cr^2}{1 + \sqrt{1-(1+k)c^2r^2}} + A_1 r^2 + A_2 r^4 + A_3 r^6 + A_4 r^8 + A_5 r^{10} + A_6 r^{12} + A_7 r^{14} + \ldots$$

In foregoing expression, Z represents the sag in the direction of the optical axis, and c represents the reciprocal of the radius of an osculating sphere, namely, the reciprocal of the curvature radius (for example, the curvature radiuses of the surfaces S1 and S2) thereof close to the optical axis. Besides, k is a quadric surface coefficient (conic surface coefficient), r is the height of the aspherical surface (i.e., the distance from the center of the lens to the edge of the lens), and A1, A2, A3, A4, A5 . . . are aspheric coefficients, wherein the coefficient A1 is 0. The parameters of the surface S1 and the surface S2 are listed in following table 2:

TABLE 2

| Aspherical Surface | Conic k | Coefficient $A_2$ | Coefficient $A_3$ | Coefficient $A_4$ | Coefficient $A_5$ | Coefficient $A_6$ | Coefficient $A_7$ |
|---|---|---|---|---|---|---|---|
| S1 | −1.77 | 3.92E−06 | −6.11E−09 | 7.11E−12 | −4.44E−15 | 1.53E−18 | −2.16E−22 |
| S2 | −1.16 | 1E−05 | −9.76E−09 | −1.68E−12 | −2.83E−15 | 5.99E−18 | −2.03E−21 |

Based on foregoing table 2, the first lens 112 is an aspherical lens. Accordingly, the distortion of the fixed-focus lens 100 may be effectively reduced. Herein the first lens 112 may be fabricated through plastic injection moulding. The first lens 112 is an aspherical lens, and each of the second lens 114 to the thirteenth lens 139 is a spherical lens and is made of a glass material such that the production cost of the fixed-focus lens 100 may be effectively reduced.

In the embodiment, the third lens group 130 remains at a fixed position in the fixed-focus lens 100, the first lens group 110 is capable of moving relative to the third lens group 130, the second lens group 120 is capable of moving relative to the third lens group 130, and the first lens group 110 is capable of moving relative to the second lens group 120. The imaging position may be changed by moving the lens groups relatively. The space ranges for moving the first lens group 110 and the second lens group 120 relatively are listed in following table 3.

TABLE 3

| Surface | Largest Space (mm) | Smallest Space (mm) |
|---|---|---|
| S6 | 17.3 | 17.2 |
| S15 | 5.35 | 5.75 |

In the first lens group 110 of the embodiment, the first lens 112 may be a convexoconcave lens with a convex surface facing the magnified side, the second lens 114 may be a meniscus lens with a convex surface facing the magnified side, and the third lens 116 may be a biconcave lens. To further simplify the fabrication process of the first lens 112 and reduce the sensitivity thereof to errors, the refractive power of the first lens 112 is reduced, namely, the fixed-focus lens 100 is made to satisfy $7.5 < |F_{1A}/F|$, wherein $F_{1A}$ is the EFL of the first lens 112.

In the second lens group 120 of the embodiment, each of the fourth lens 121 and the seventh lens 127 may be a convexoconcave lens with a convex surface facing the magnified side, the eighth lens 129 may be a concavoconvex lens with a convex surface facing the magnified side, and each of the fifth lens 123 and the sixth lens 125 may be a biconvex lens, wherein because the fourth lens 121, the seventh lens 127, and the eighth lens 129 are meniscus lenses, the spherical aberration and field curvature may be effectively reduced.

In the third lens group 130 of the embodiment, each of the ninth lens 131, the eleventh lens 135, and the thirteenth lens 139 may be a biconvex lens, the tenth lens 133 may be a biconcave lens, and the twelfth lens 137 may be a convexoconcave lens with a convex surface facing the magnified side. In the third lens group 130, the ninth lens 131, the tenth lens 133, and the eleventh lens 135 form a triple cemented lens, and the twelfth lens 137 and the thirteenth lens 139 form a double cemented lens, so that the spherical aberration and color aberration of the fixed-focus lens 100 may be effectively reduced.

In addition, because the thirteenth lens 139 is a biconvex lens, the thirteenth lens 139 may effectively collect the light beam from the reduced side and allow the light beam to be transmitted to the magnified side through the fixed-focus lens 100, so as to increase the optical intensity of the image at the magnified side.

Figure 2A:
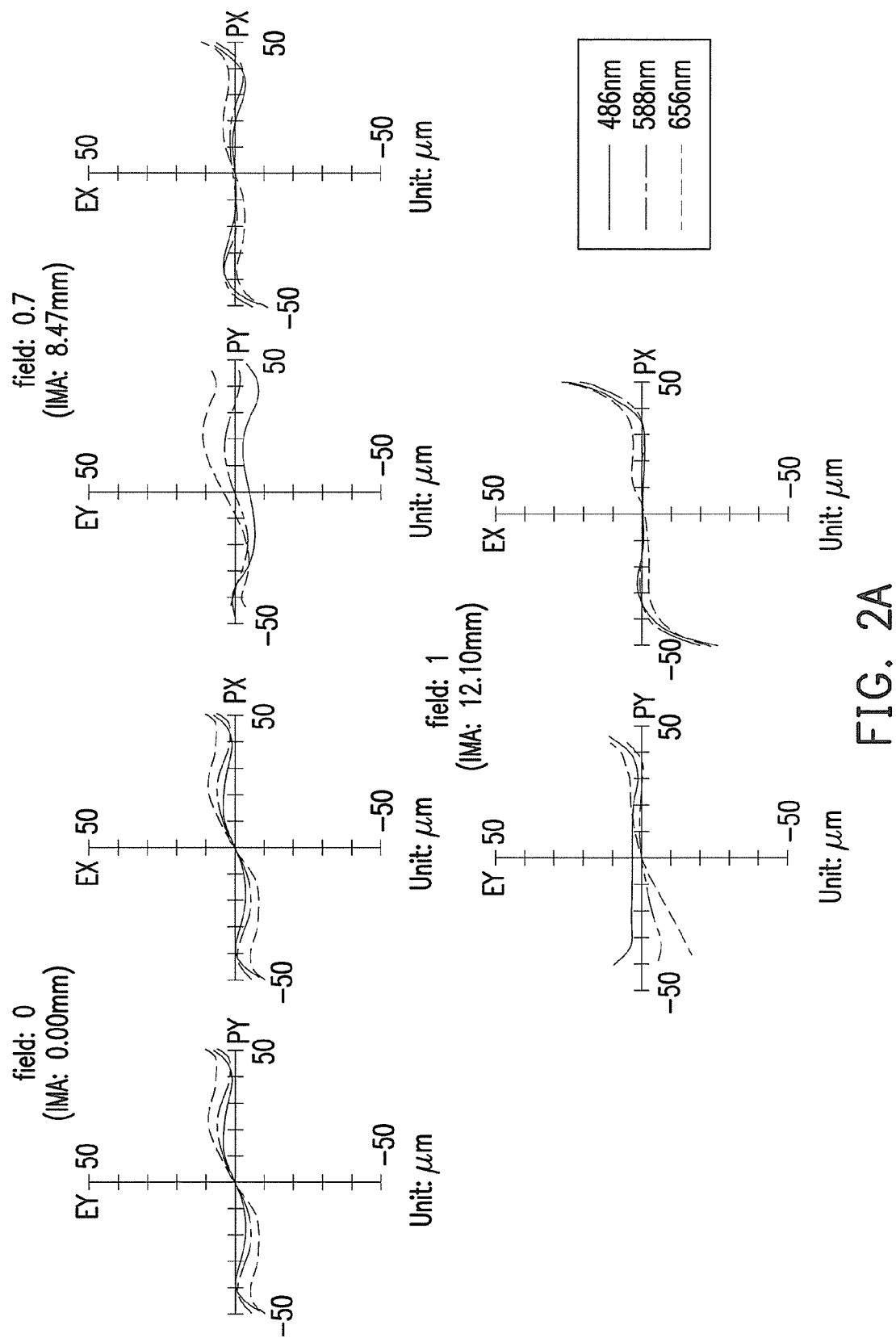
FIGS. 2A~2D are optical imaging simulation data plots of the fixed-focus lens in FIG. 1.
Figure 2B:
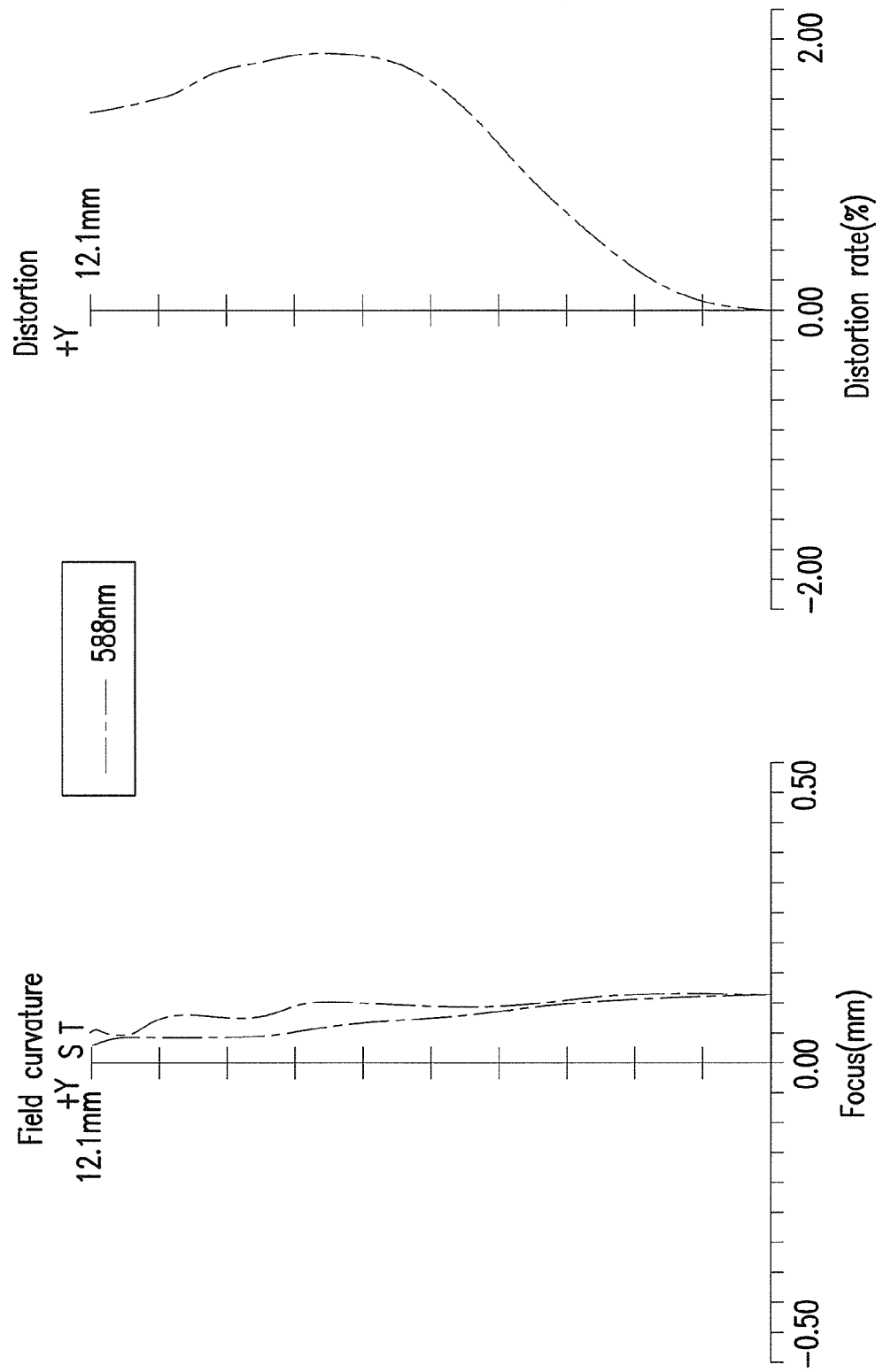
Figure 2C:
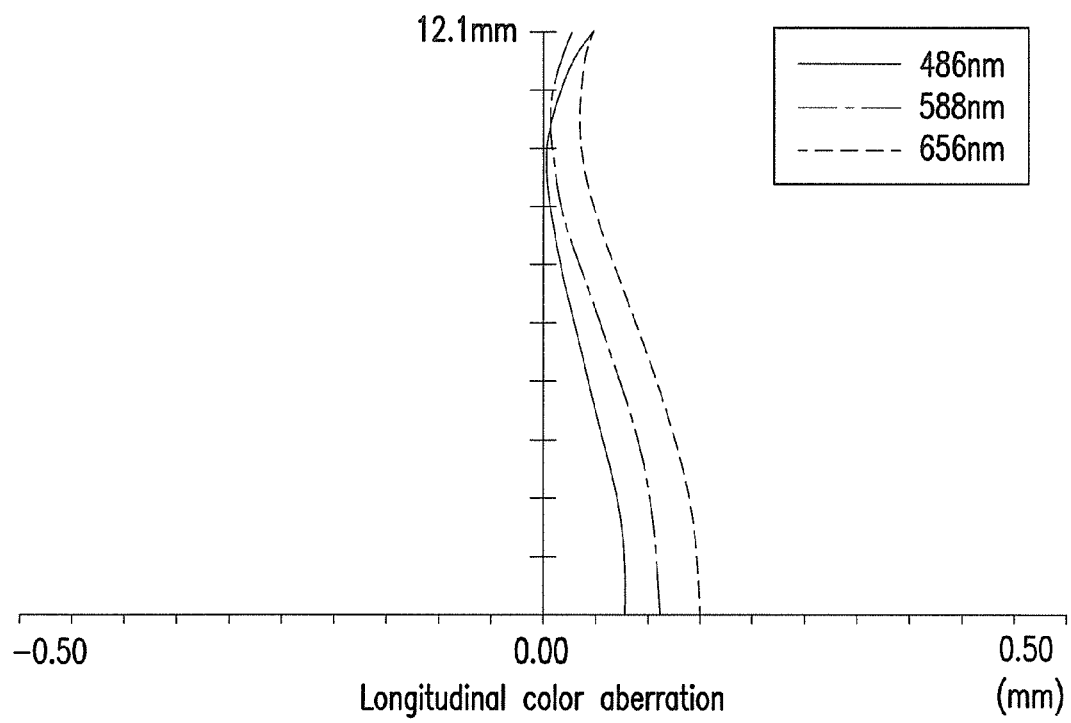
Figure 2D:
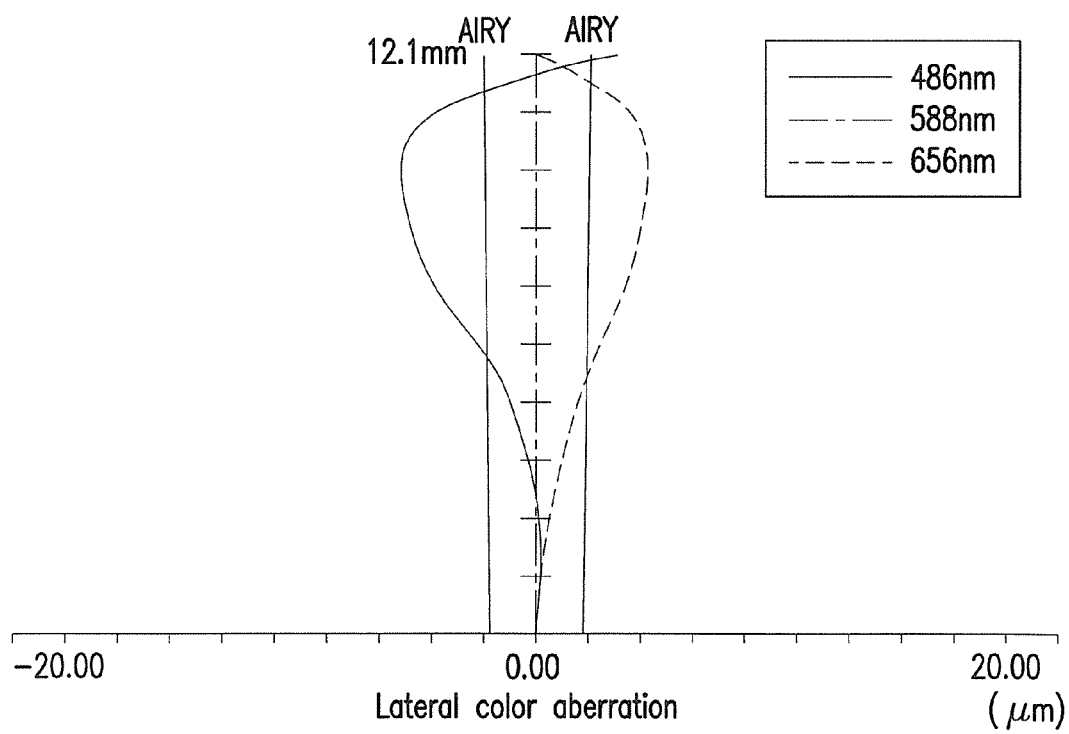

Herein the simulation is respectively carried out with a red light having a wavelength of 656 nm, a green light having a wavelength of 588 nm, and a blue light having a wavelength of 486 nm. Referring to FIGS. 2A~2D, FIG. 2A is a transverse ray fan plot, wherein the top left plot is the transverse ray fan plot when the field is 0, the top right plot is the transverse ray fan plot when the field is 0.7, and the bottom plot is the transverse ray fan plot when the field is 1. FIG. 2B illustrates respectively a field curvature plot and a distortion plot arranged in sequence from left side to right side. In the field curvature plot, the abscissa indicates the distance to the focal plane, and the ordinate indicates the magnitude of the field (from 0 to the maximum field). In the distortion plot, the abscissa indicates the percentage of the distortion, and the ordinate indicates the magnitude of the field (from 0 to the maximum field). FIG. 2C is an axial color aberration plot, and herein the simulation is performed with the green light, wherein the abscissa indicates the distance to a focal plane with no color aberration, and the ordinate indicates the magnitude of the field (from 0 to the maximum field). FIG. 2D is a lateral color aberration plot, and herein the simulation is performed based on the green light, wherein the abscissa indicates the distance to the light having the wavelength of 588 nm, and the ordinate indicates the magnitude of the field (from 0 to the maximum field). The plots illustrated in FIGS. 2A~2D are all within the standard ranges, and accordingly the fixed-focus lens 100 in the embodiment has a good imaging quality.

Figure 3:
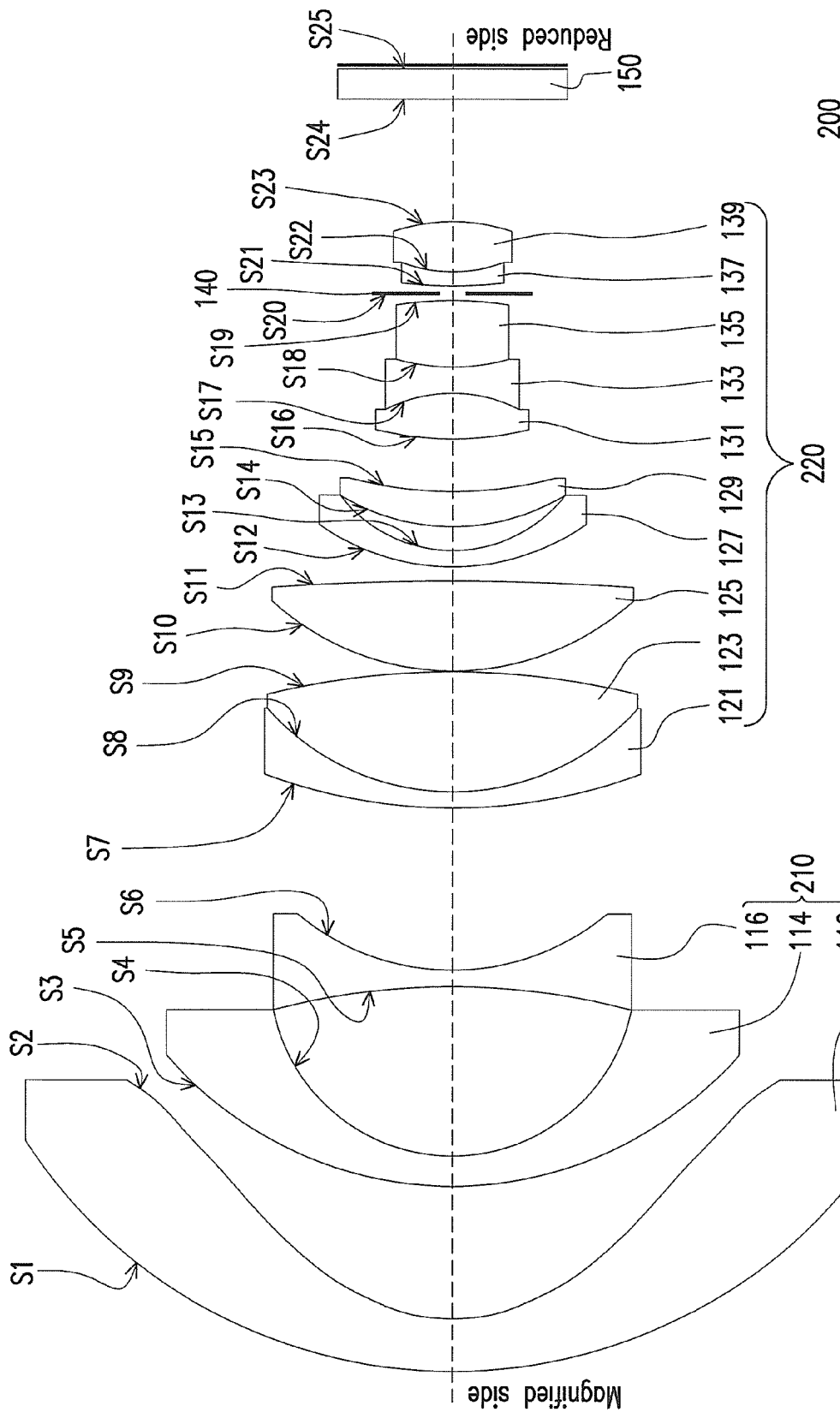
FIG. 3 is a diagram of a fixed-focus lens according to another embodiment of the invention.

Referring to FIG. 3, the fixed-focus lens 200 is similar to the fixed-focus lens 100 (as illustrated in FIG. 1) described above, and the difference between the two may be described herein. In the embodiment, the fixed-focus lens 200 includes a first lens group 210 and a second lens group 220, and the fixed-focus lens 200 satisfies $|F_1/F|<1.35$ and $4<|F_2/F|<6.5$, wherein $F_1$ is the EFL of the first lens group 210, $F_2$ is the EFL of the second lens group 220, and F is the EFL of the fixed-focus lens 200.

Besides, in the embodiment, the arrangement of the lenses in the fixed-focus lens 200 is the same as that in the fixed-focus lens 100 and may not be described herein.

An embodiment of the fixed-focus lens 200 may be described below. However, this embodiment is not intended for limiting the invention.

TABLE 4

| Surface | Curvature Radius (mm) | Space (mm) | Refractive Index | Abbe Number | Note |
|---|---|---|---|---|---|
| S1 | 55.839 | 5.482 | 1.491756 | 57.4 | First lens |
| S2 | 19.06 | 14.142 | | | |
| S3 | 37.946 | 3.099 | 1.715493 | 50.9 | Second lens |
| S4 | 18.843 | 17.834 | | | |
| S5 | −67.181 | 1.6 | 1.810563 | 40.4 | Third lens |
| S6 | 24.946 | 17.002 | | | |
| S7 | 56.954 | 1.6 | 1.84666 | 23.8 | Fourth lens |
| S8 | 25.449 | 12.454 | 1.68904 | 29.8 | Fifth lens |
| S9 | −85.116 | 0.1 | | | |
| S10 | 27.521 | 9.639 | 1.547657 | 46 | Sixth lens |
| S11 | −193.818 | 1.202 | | | |
| S12 | 24.025 | 1.6 | 1.804 | 46.6 | Seventh lens |
| S13 | 14.543 | 2.503 | | | |
| S14 | 21.834 | 3.528 | 1.661069 | 31.6 | Eighth lens |
| S15 | 42.652 | 5.722 | | | |
| S16 | 35.315 | 4.603 | 1.511912 | 65.6 | Ninth lens |
| S17 | −15.634 | 3.089 | 1.804 | 46.6 | Tenth lens |
| S18 | 18.084 | 7.2 | 1.496999 | 81.5 | Eleventh lens |
| S19 | −23.493 | 0.1 | | | |
| S20 | Infinite | 0.244 | | | Aperture stop |
| S21 | 36.237 | 1.6 | 1.834233 | 27.6 | Twelfth lens |
| S22 | 16.113 | 5.181 | 1.496999 | 81.5 | Thirteenth |
| S23 | −19.480 | 21.5 | | | |
| S24 | Infinite | 3 | 1.48749 | 70.2 | Glass cover |
| S25 | Infinite | 0.483 | | | |

In foregoing table 4, the surfaces S1~S23 are the same as those in foregoing table 1 and have the same advantages and functions and the advantages and functions may not be described herein.

In addition, the second lens group 220 remains at a fixed position in the fixed-focus lens 200, and the first lens group 210 is capable of moving relative to the second lens group 220, so as to accomplish the focusing. The space range for the first lens group 210 to move relatively in the fixed-focus lens 200 is listed in following table 5.

TABLE 5

| Surface | Largest Space (mm) | Smallest Space (mm) |
|---|---|---|
| S6 | 17.15 | 16.85 |

Figure 4A:
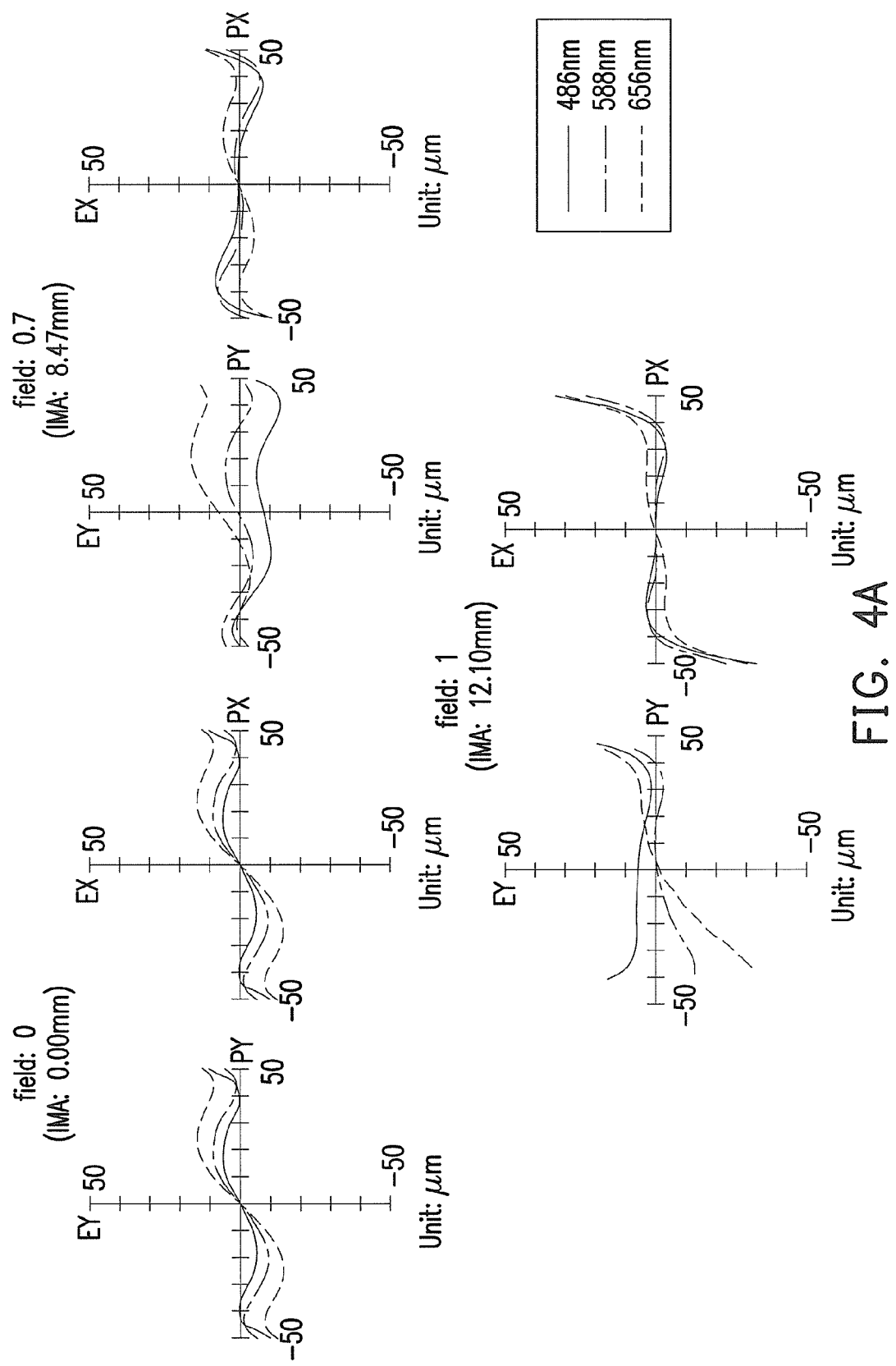
FIGS. 4A~4D are optical imaging simulation data plots of the fixed-focus lens in FIG. 3.
Figure 4B:
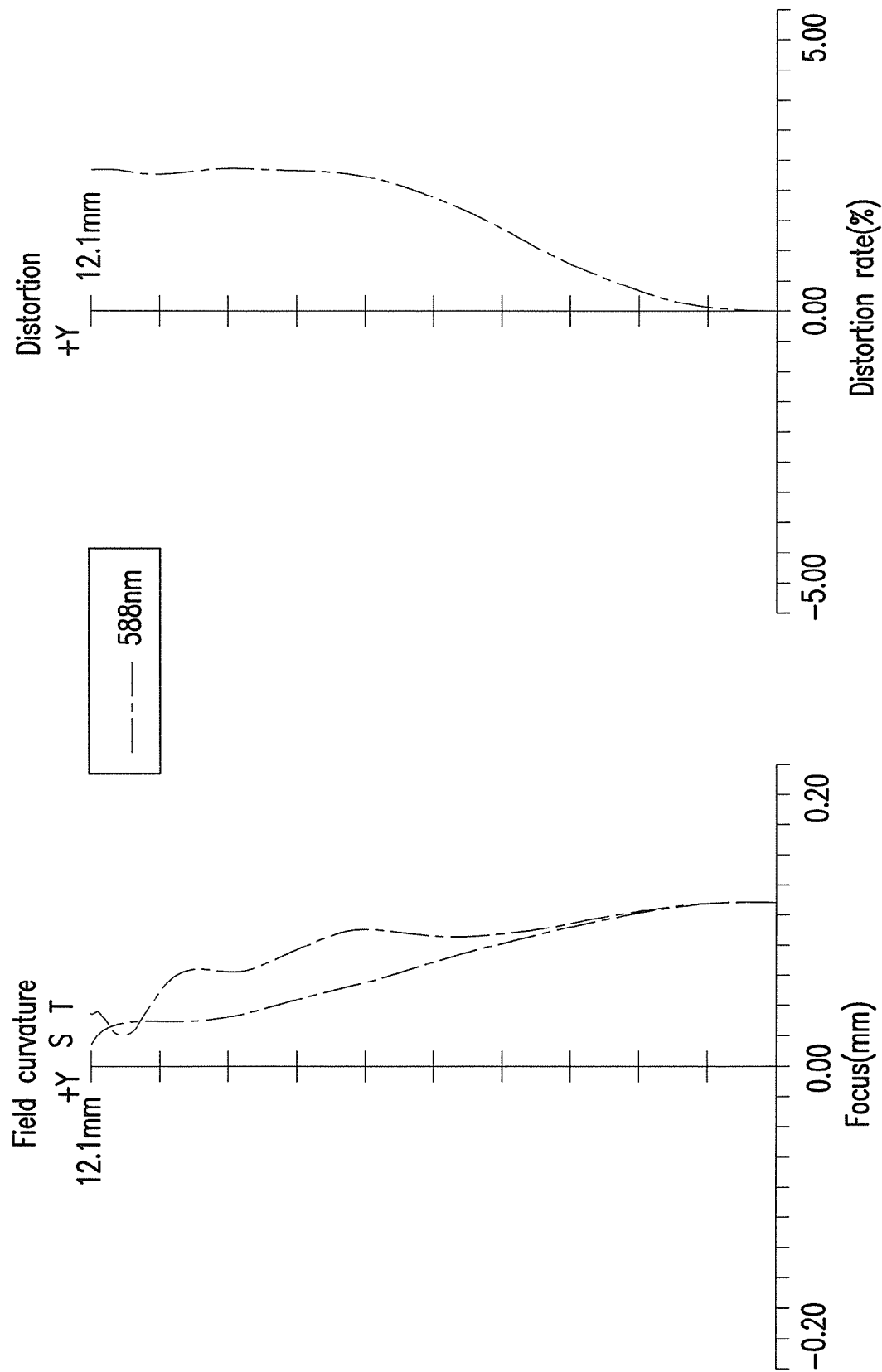
Figure 4C:
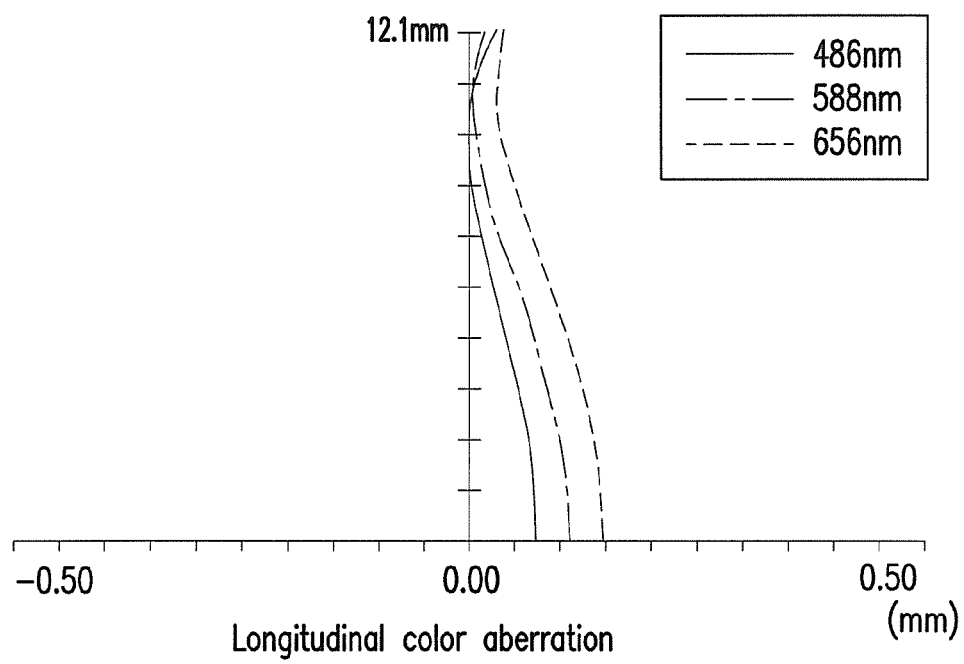
Figure 4D:
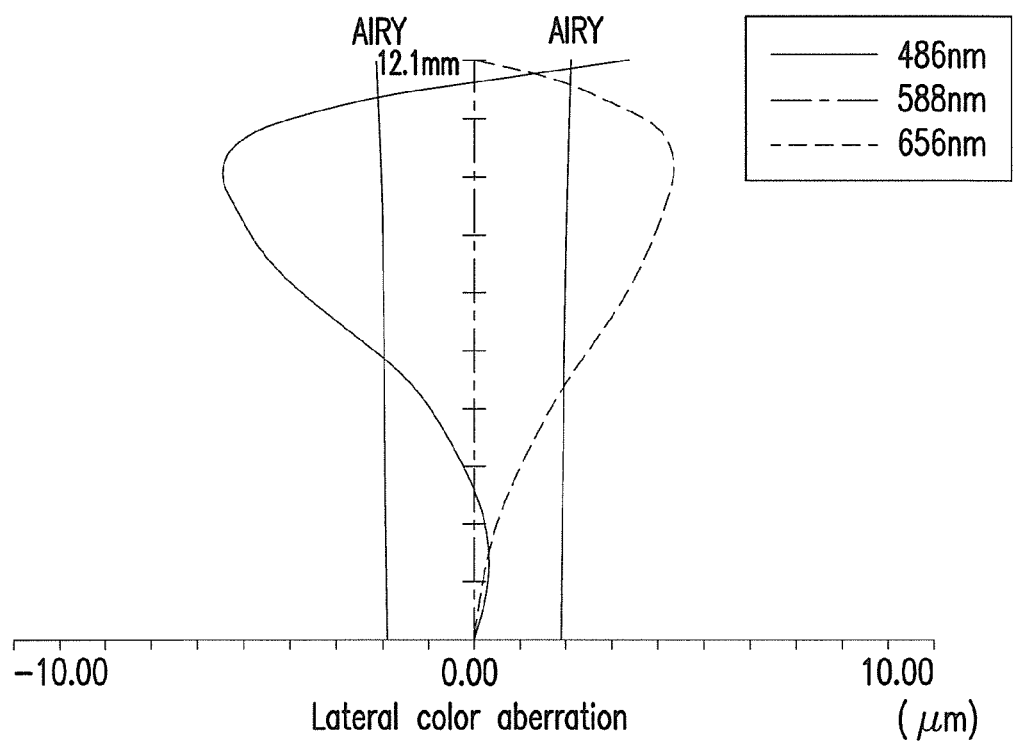

The simulation is respectively carried out with a red light having a wavelength of 656 nm, a green light having a wavelength of 588 nm, and a blue light having a wavelength of 486 nm. Referring to FIGS. 4A~4D, FIG. 4A is a transverse ray fan plot, and FIG. 4B illustrates respectively a field curvature plot and a distortion plot. FIG. 4C is an axial color aberration plot, and FIG. 4D is a lateral color aberration plot, and herein the simulation is performed based on the green light. The plots illustrated in FIGS. 4A~4D are all within the standard ranges, and accordingly the fixed-focus lens 200 in the embodiment has a good imaging quality.

The embodiment or the embodiments of the invention may have at least one of the following advantages. As described above, in the embodiments of the invention, the lens groups in a fixed-focus lens has thirteen lenses. Thereby, the fixed-focus lens provided by the embodiments of the invention has fewer lenses and simpler structure compared to the conventional lenses. Moreover, the first lens is an aspherical lens such that the distortion of the fixed-focus lens may be effectively reduced, and the other lenses are all spherical lenses such that the fabricating cost may be effectively reduced.

Furthermore, the fixed-focus lens provided by the embodiments of the invention further includes meniscus lenses and cemented lenses, wherein the meniscus lenses may effectively reduce the spherical aberration and the field curvature, and the cemented lenses may effectively reduce the spherical aberration and the color aberration. Thereby, the fixed-focus lens in the invention has both lower production cost and better imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, adapted to be disposed between a magnified side and a reduced side, the fixed-focus lens comprising:
    a first lens group, disposed between the magnified side and the reduced side and having a negative refractive power, the first lens group comprising a first lens, a second lens, and a third lens arranged in sequence from the magnified side to the reduced side, wherein the first lens is an aspherical lens, and refractive powers of the first lens, the second lens, and the third lens are all negative;
    a second lens group, disposed between the first lens group and the reduced side and having a positive refractive power, the second lens group comprising a fourth lens, a fifth lens, a sixth lens, a seventh lens, and an eighth lens arranged in sequence from the magnified side to the reduced side, wherein refractive powers of the fourth lens, the fifth lens, the sixth lens, the seventh lens, and the eighth lens are respectively negative, positive, positive, negative, and positive; and
    a third lens group, disposed between the second lens group and the reduced side and having a positive refractive power, the third lens group comprising a ninth lens, a tenth lens, an eleventh lens, a twelfth lens, and a thirteenth lens arranged in sequence from the magnified side to the reduced side, wherein refractive powers of the ninth lens, the tenth lens, the eleventh lens, the twelfth lens, and the thirteenth lens are respectively positive, negative, positive, negative, and positive,
    wherein the fixed-focus lens satisfies $|F_1/F|<1.35$, $3.5<|F_2/F|<4.5$, and $4|F_3/F|<5$, wherein $F_1$ is an effective focal length of the first lens group, $F_2$ is an effective focal length of the second lens group, $F_3$ is an effective focal length of the third lens group, and F is an effective focal length of the fixed-focus lens.

2. The fixed-focus lens according to claim 1, wherein the third lens group remains at a fixed position in the fixed-focus lens, the first lens group is capable of moving relative to the third lens group, the second lens group is capable of moving relative to the third lens group, and the first lens group is capable of moving relative to the second lens group, so as to accomplish focusing.

3. The fixed-focus lens according to claim 1, wherein each of the second lens, the third lens, the fourth lens, the fifth lens, the sixth lens, the seventh lens, the eighth lens, the ninth lens, the tenth lens, the eleventh lens, the twelfth lens, and the thirteenth lens is a spherical lens.

4. The fixed-focus lens according to claim 1, wherein the fixed-focus lens satisfies $7.5<|F_{1A}/F|$, and $F_{1A}$ is an effective focal length of the first lens.

5. The fixed-focus lens according to claim 1, wherein the first lens is a convexoconcave lens with a convex surface facing the magnified side, the second lens is a meniscus concave lens with a convex surface facing the magnified side, and the third lens is a biconcave lens.

6. The fixed-focus lens according to claim 1, wherein each of the fourth lens and the seventh lens is a convexoconcave lens with a convex surface facing the magnified side, the eighth lens is a concavoconvex lens with a convex surface facing the magnified side, and each of the fifth lens and the sixth lens is a biconvex lens.

7. The fixed-focus lens according to claim 1, wherein the fourth lens and the fifth lens form a first double cemented lens.

8. The fixed-focus lens according to claim 1, wherein each of the ninth lens, the eleventh lens, and the thirteenth lens is a biconvex lens, the tenth lens is a biconcave lens, and the twelfth lens is a convexoconcave lens with a convex surface facing the magnified side.

9. The fixed-focus lens according to claim 1, wherein the twelfth lens and the thirteenth lens form a second double cemented lens.

10. The fixed-focus lens according to claim 1, wherein the ninth lens, the tenth lens, and the eleventh lens form a triple cemented lens.

11. The fixed-focus lens according to claim 1 further comprising an aperture stop disposed between the eleventh lens and the twelfth lens.

12. A fixed-focus lens, adapted to be disposed between a magnified side and a reduced side, the fixed-focus lens comprising:
    a first lens group, disposed between the magnified side and the reduced side and having a negative refractive power, the first lens group comprising a first lens, a second lens, and a third lens arranged in sequence from the magnified side to the reduced side, wherein the first lens is an aspherical lens, and the refractive powers of the first lens, the second lens, and the third lens are all negative; and
    a second lens group, disposed between the first lens group and the reduced side and having a positive refractive power, the second lens group comprising a fourth lens, a fifth lens, a sixth lens, a seventh lens, an eighth lens, a ninth lens, a tenth lens, an eleventh lens, a twelfth lens, and a thirteenth lens arranged in sequence from the magnified side to the reduced side, wherein refractive powers of the fourth lens, the fifth lens, the sixth lens, the seventh lens, the eighth lens, the ninth lens, the tenth lens, the eleventh lens, the twelfth lens, and the thirteenth lens are respectively negative, positive, positive, negative, positive, positive, negative, positive, negative, and positive,
    wherein the fixed-focus lens satisfies $|F_1/F|<1.35$ and $4|<F_2/F|<6.5$, wherein $F_1$ is an effective focal length of the first lens group, $F_2$ is an effective focal length of the second lens group, and F is an effective focal length of the fixed-focus lens.

13. The fixed-focus lens according to claim 12, wherein the second lens group remains at a fixed position in the fixed-focus lens, and the first lens group is capable of moving relative to the second lens group, so as to accomplish focusing.

14. The fixed-focus lens according to claim 12, wherein each of the second lens, the third lens, the fourth lens, the fifth lens, the sixth lens, the seventh lens, the eighth lens, the ninth lens, the tenth lens, the eleventh lens, the twelfth lens, and the thirteenth lens is a spherical lens.

15. The fixed-focus lens according to claim 12, wherein the fixed-focus lens satisfies $7.5<F_{1A}/F|$, wherein $F_{1A}$, is an effective focal length of the first lens.

16. The fixed-focus lens according to claim 12, wherein the first lens is a convexoconcave lens with a convex surface facing the magnified side, the second lens is a meniscus concave lens with a convex surface facing the magnified side, and the third lens is a biconcave lens.

17. The fixed-focus lens according to claim 12, wherein each of the fourth lens, the seventh lens, and the twelfth lens is a convexoconcave lens with a convex surface facing the magnified side, the eighth lens is a concavoconvex lens with a convex surface facing the magnified side, and wherein each of the fifth lens, the sixth lens, the ninth lens, the eleventh lens, and the thirteenth lens is a biconvex lens, and the tenth lens is a biconcave lens.

18. The fixed-focus lens according to claim 12, wherein the fourth lens and the fifth lens foam a first double cemented lens, and the twelfth lens and the thirteenth lens form a second double cemented lens.

19. The fixed-focus lens according to claim 12, wherein the ninth lens, the tenth lens, and the eleventh lens foam the triple cemented lens.

20. The fixed-focus lens according to claim 12 further comprising an aperture stop disposed between the eleventh lens and the twelfth lens.

* * * * *